US009868429B2

(12) United States Patent
Takeuchi et al.

(10) Patent No.: US 9,868,429 B2
(45) Date of Patent: Jan. 16, 2018

(54) VEHICLE-USE BRAKE APPARATUS

(71) Applicants: DENSO CORPORATION, Kariya, Aichi-pref. (JP); ADVICS CO., LTD., Kariya, Aichi-pref. (JP)

(72) Inventors: Kiyohito Takeuchi, Kariya (JP); Tatsushi Kobayashi, Kariya (JP); Aritomo Nabeta, Obu (JP)

(73) Assignee: ADVICS CO., LTD., Kariya, Aichi-pref. (JP)

( * ) Notice: Subject to any disclaimer, the term of this patent is extended or adjusted under 35 U.S.C. 154(b) by 0 days.

(21) Appl. No.: 15/216,223

(22) Filed: Jul. 21, 2016

(65) Prior Publication Data

US 2017/0021815 A1    Jan. 26, 2017

(30) Foreign Application Priority Data

Jul. 24, 2015    (JP) .................................. 2015-146940

(51) Int. Cl.
| | |
|---|---|
| *B60T 13/16* | (2006.01) |
| *B60T 13/66* | (2006.01) |
| *B60T 7/04* | (2006.01) |
| *B60T 13/14* | (2006.01) |

(52) U.S. Cl.
CPC ............ *B60T 13/662* (2013.01); *B60T 7/042* (2013.01); *B60T 13/146* (2013.01)

(58) Field of Classification Search
CPC .... B60T 13/662; B60T 13/161; B60T 13/146; B60T 13/20; B60T 8/36; B60T 8/367; B60T 7/042
USPC ................. 303/10, 2, 3, 115.4, 115.5, 116.1; 701/71, 78
See application file for complete search history.

(56) References Cited

U.S. PATENT DOCUMENTS

| | | | | |
|---|---|---|---|---|
| 7,010,410 B2* | 3/2006 | Zhang | ....................... | B60L 7/26 303/11 |
| 8,128,181 B2* | 3/2012 | Yamauchi | ................. | B60T 8/36 303/11 |
| 2002/0008426 A1* | 1/2002 | Isono | ...................... | B60T 8/367 303/115.4 |
| 2004/0167698 A1 | 8/2004 | Zhang et al. | | |
| 2009/0001807 A1* | 1/2009 | Nomura | .................... | B60T 8/36 303/20 |
| 2011/0071743 A1* | 3/2011 | Taniguchi | ................. | B60T 8/36 701/70 |

(Continued)

FOREIGN PATENT DOCUMENTS

| | | |
|---|---|---|
| JP | 2012-131299 A | 7/2012 |
| JP | 2013-203153 A | 10/2013 |

*Primary Examiner* — Pamela Rodriguez
(74) *Attorney, Agent, or Firm* — Knobbe, Martens, Olson & Bear, LLP

(57) ABSTRACT

A vehicle-use brake apparatus has a control unit which includes a correcting pressure acquisition section that acquires a flow rate correcting pressure corresponding to a discharge amount of brake fluid discharged by a pump, a command differential pressure acquisition section that acquires a command differential pressure by performing a flow rate correction where the flow rate correcting pressure is subtracted from a target wheel cylinder pressure, and a correction restriction section that performs a correction restriction by which the flow rate correcting pressure is reduced or the flow rate correction is not performed if an actual wheel cylinder pressure is smaller than a target wheel cylinder pressure.

7 Claims, 5 Drawing Sheets

(56) References Cited

U.S. PATENT DOCUMENTS

| | | | | |
|---|---|---|---|---|
| 2013/0057051 A1* | 3/2013 | Matsuura | ............... | B60K 6/445 303/3 |
| 2015/0232076 A1* | 8/2015 | Oosawa | ................ | B60T 13/147 303/10 |
| 2015/0291137 A1* | 10/2015 | Takeuchi | .................. | B60T 8/34 303/10 |

* cited by examiner

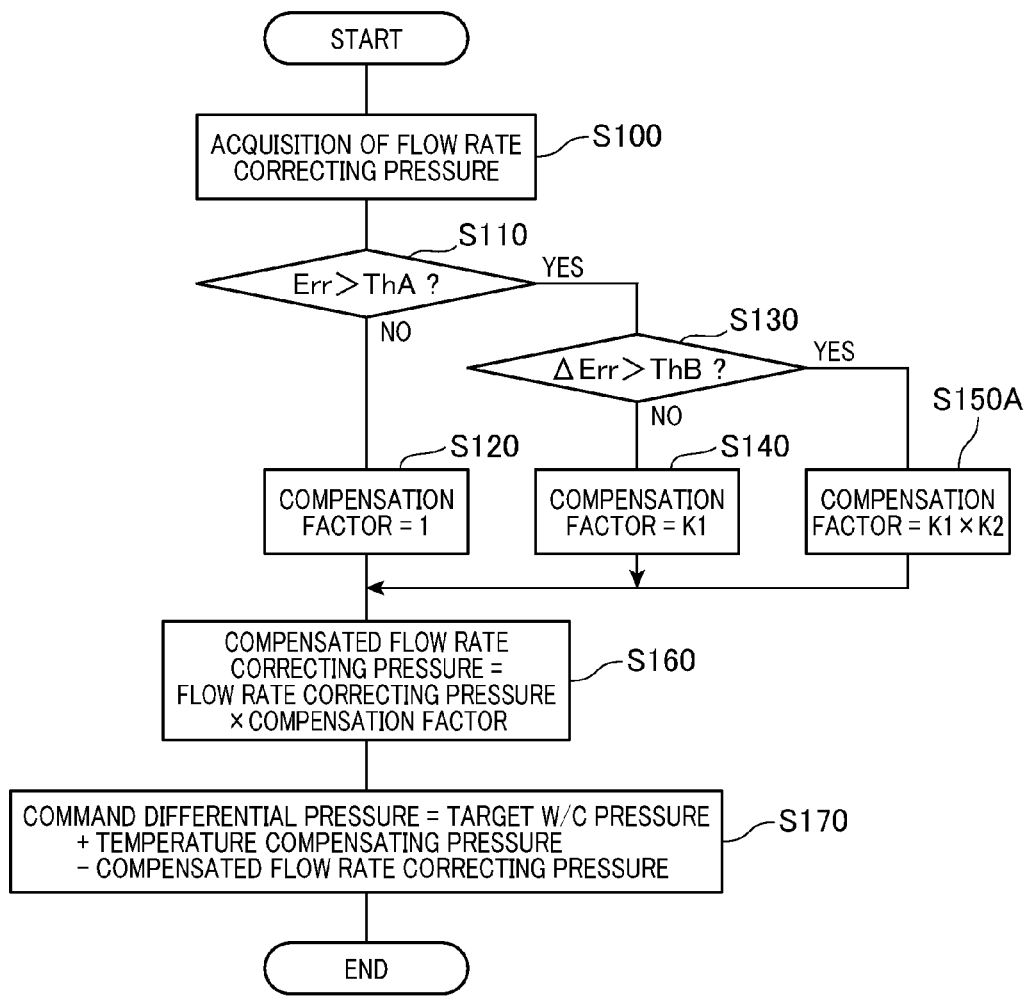

VEHICLE-USE BRAKE APPARATUS

This application claims priority to Japanese Patent Application No. 2015-146940 filed on Jul. 24, 2015, the entire contents of which are hereby incorporated by reference.

BACKGROUND OF THE INVENTION

1. Field of the Invention

The present invention relates to a vehicle-use brake apparatus.

2. Description of Related Art

Generally, a vehicle-use brake apparatus is configured to generate a braking force by causing a pump to operate to generate a differential pressure between a M/C (master cylinder) and a W/C (wheel cylinder) using a differential pressure control valve provided in a hydraulic brake circuit.

In such a vehicle-use brake apparatus, even when the differential pressure control valve is out of operation, there occurs a pressure difference between the upstream side and the downstream side of the differential pressure control valve, that is, between the M/C side and the W/C side depending on the discharge flow rate of the pump. Accordingly, the vehicle-use brake apparatus described in Japanese Patent Application Laid-open No. 2013-203153 is configured to set a target differential pressure which is lower than a desired differential pressure by the pressure difference caused by a discharge flow of the pump, and supply a current corresponding to this target differential pressure to the differential pressure control valve. That is, the vehicle-use brake apparatus described in this patent document performs a flow rate correction in which the value of the current supplied to the differential pressure control valve is corrected depending on the discharge flow rate of the pump.

However, the above described conventional vehicle-use brake apparatus has a problem in that, when the W/C pressure has to be increased rapidly in a heavy braking situation, a time delay in increasing the W/C pressure may occur due to the flow rate correction.

SUMMARY

An exemplary embodiment provides a vehicle-use brake apparatus including:
a brake operating member operated by a vehicle driver;
a master cylinder configured to generate a master cylinder pressure in accordance with an operation amount of the brake operating member;
at least one wheel cylinder configured to generate a braking force to a vehicle wheel when applied with a wheel cylinder pressure caused by the master cylinder pressure;
a differential pressure control valve provided in a main pipeline connected between the master cylinder and the wheel cylinder to generate a differential pressure between the master cylinder pressure and the wheel cylinder pressure;
a pump configured to increase the wheel cylinder pressure by discharging a brake fluid between the differential pressure control valve and the wheel cylinder with the differential pressure being generated by the differential pressure control valve;
a motor configured to drive the pump; and
a control unit configured to output a command differential pressure corresponding to a value of the differential pressure set depending on a target wheel cylinder pressure;
the motor being driven to cause the pump to operate to increase the wheel cylinder pressure with the differential pressure being generated by the differential pressure control valve to generate the braking force; wherein
the control unit includes:
a correcting pressure acquisition section that acquires a flow rate correcting pressure corresponding to a discharge amount of the brake fluid discharged by the pump;
a command differential pressure acquisition section configured to acquire the command differential pressure by performing a flow rate correction where the flow rate correcting pressure is subtracted depending on the target wheel cylinder pressure; and
a correction restriction section configured to perform a correction restriction by which the flow rate correcting pressure is reduced or the flow rate correction is not performed if an actual wheel cylinder pressure is smaller than the target wheel cylinder pressure.

According to the exemplary embodiment, there is provided a vehicle-use brake apparatus having a function to perform the above described flow rate correction, which is capable of increasing the W/C pressure rapidly when heavy breaking is required.

Other advantages and features of the invention will become apparent from the following description including the drawings and claims.

BRIEF DESCRIPTION OF THE DRAWINGS

In the accompanying drawings:

FIG. 9 is a flowchart showing steps of a brake pressure control process performed in a vehicle-use brake apparatus according to a second embodiment of the invention;

PREFERRED EMBODIMENTS OF THE INVENTION

First Embodiment

Figure 1:
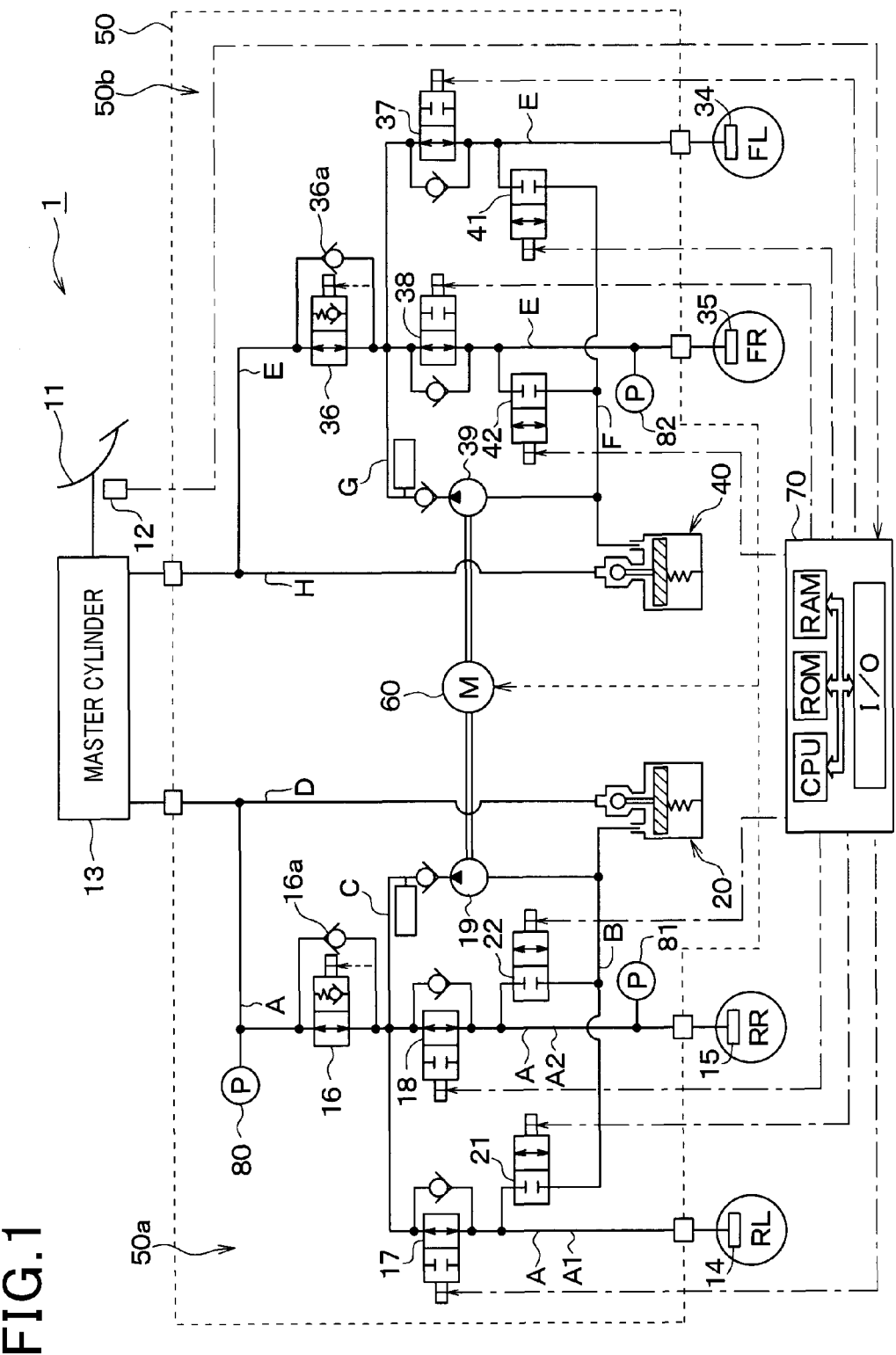
FIG. 1 is a hydraulic circuit diagram of a vehicle-use brake apparatus according to a first embodiment of the invention.
Figure 2:
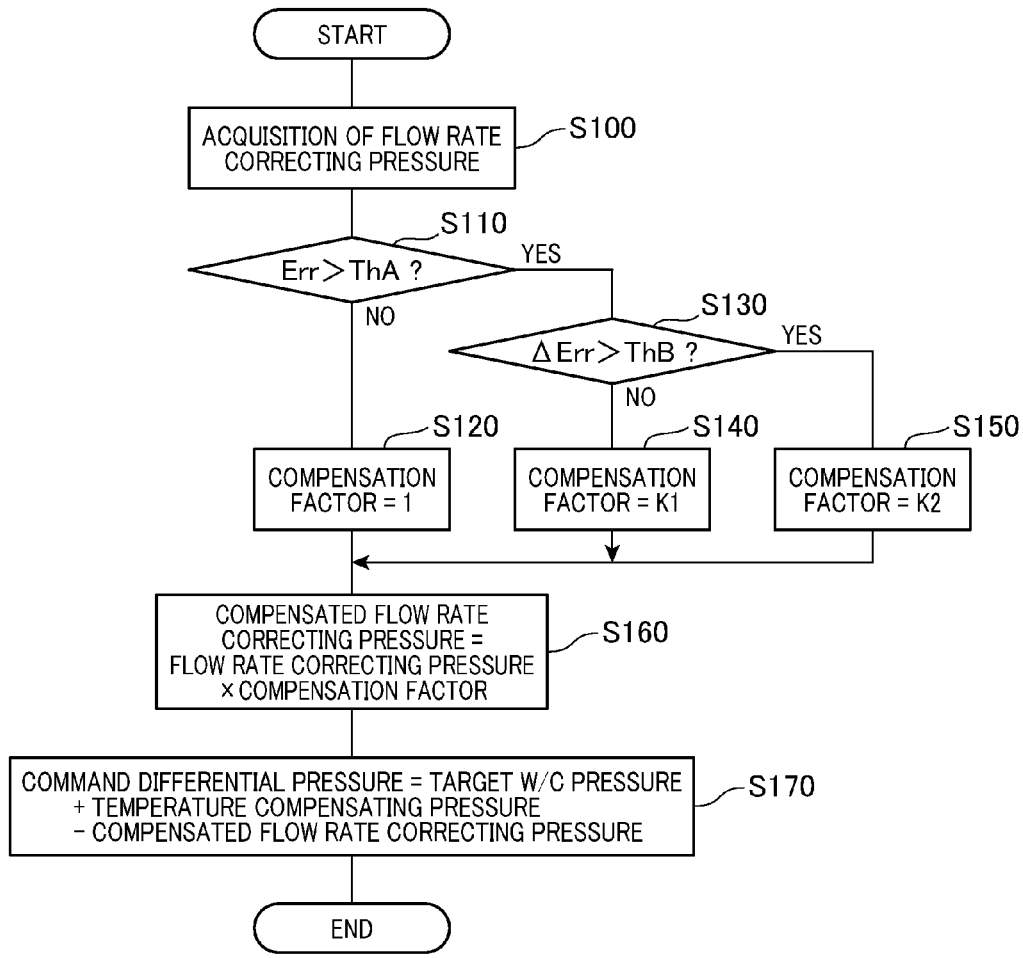
FIG. 2 is a flowchart sowing steps of a brake pressure control process performed by a brake ECU 70 included in the vehicle-use brake apparatus according to the first embodiment of the invention.
Figure 3:
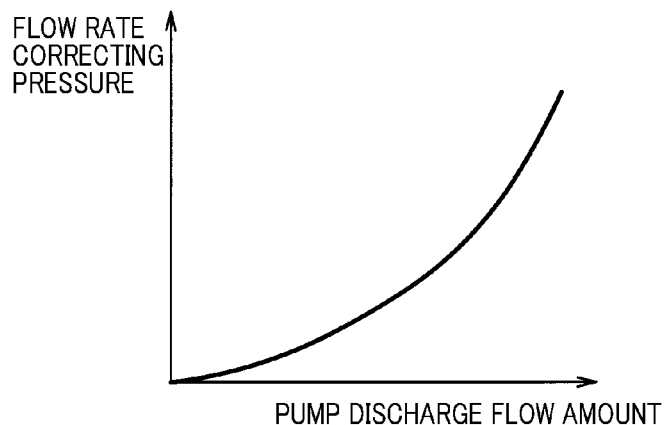
FIG. 3 is a diagram showing a relationship between a pump discharge flow rate and a flow rate correcting pressure in the vehicle-use brake apparatus according to the first embodiment of the invention.

FIG. 1 is a hydraulic circuit diagram of a vehicle-use brake apparatus 1 according to a first embodiment of the invention. This hydraulic brake circuit adopts a front-rear piping system. However, the hydraulic brake circuit may adopt an X-piping system.

When a vehicle driver steps on a brake pedal 11 as a brake operating member, a stroke sensor 12 detects a pedal stroke S. Further, a not-shown master piston provided in a M/C (master cylinder) 13 is pressed. As a result, a M/C pressure occurs in both a primary chamber and a secondary chamber which are separated from each other. The M/C pressure is transmitted to W/Cs (wheel cylinders) 14, 15 34 and 35 through a brake hydraulic control actuator 50.

The brake hydraulic control actuator 50 includes a first piping system 50a and a second piping system 50b which are integrated in a block made of aluminum or the like together with various components. The first piping system 50a is a rear system for controlling a brake fluid pressure applied to the rear right wheel RR and the rear left wheel RL. The second piping system 50b is a front system for controlling a brake fluid pressure applied to the front left wheel FL and the front right wheel FR.

The first piping system 50a and the second piping system 50b are the same as each other in basic structure. Accordingly, only the first piping system 50a is explained in detail in the following.

The first piping system 50a includes a pipeline A as a main pipeline that transmits the M/C pressure to the W/C 14 provided in the rear left wheel RL and the W/C 15 provided in the rea right wheel RR.

The pipeline A is provided with a first differential pressure control valve 16 which controls the pressure difference between a first pipeline on the side of the M/C 13 and a second pipeline on the side of the W/Cs 14 and 15 by changing the state of the pipeline A between a communicating state and a differential pressure state. The first differential pressure control valve 16 is set in the communicating state when a control current is not supplied to its solenoid coil. When the control current is supplied to the solenoid coil, the valve position is adjusted in accordance with the control current such that the differential pressure increases as the control current increases. However, since the differential pressure generated by the first differential pressure control valve 16 changes with a pump discharge flow rate, a flow rate correction is performed as explained later.

While the first differential pressure control valve 16 is in the differential pressure state, the brake fluid is allowed to flow from the W/Cs 14 and 15 to the M/C 13 only when the pressure on the side of the W/Cs 14 and 15 is higher than the M/C pressure. Accordingly, the pressure on the side of the W/Cs 14 and 15 are maintained not to exceed the pressure on the side of the M/C by over a predetermined value. The first differential pressure control valve 16 is provided with a check valve 16a.

The pipeline A branches into a pipeline A1 and a pipeline A2 on the side of the W/Cs 14 and 15 which is downstream from the first differential pressure control valve 16. The pipeline A1 is provided with a first booster control valve 17 which controls intensification of the brake fluid pressure supplied to the W/C 14. The pipeline A2 is provided with a second booster control valve 18 which controls intensification of the brake fluid pressure supplied to the W/C 15.

Each of the first and second booster control valves 17 and 18 is a normal open type two-position electromagnetic valve capable of switching between a communicating state and a shut-off state. When a control current supplied to the solenoid coil of the first and second booster control valve 17 or 18 is zero, that is, when they are not energized, they are set in the communicating state. When they are energized, they are set in the shut-off state.

A pipeline B is connected as a decompression pipeline between the first booster control valve 17 and the W/C 14 and between the second booster control valve 18 and the W/C 15 at its one ends. The other end of the pipeline B is connected with a pressure regulating reservoir 20. The pipeline B is provided with a first pressure reduction control valve 21 and a second pressure reduction control valve 22 each of which is a normal close type two-position electromagnetic valve capable of switching between a communicating state and a shut-off state. When a control current supplied to the solenoid coil of the first and second pressure reduction control valves 21 and 22 is zero, that is, when they are not energized, they are set in the shut-off state. When they are energized, they are set in the communicating state.

Between the pressure regulating reservoir 20 and the pipeline A, a pipeline C is provided as a return pipeline. The pipeline C is provided with a self-priming pump 19 which sucks the brake fluid from the pressure regulating reservoir 20 and discharges it to the M/C 13 or to the W/Cs 14 and 15. The pump 19 is driven by a motor 60. The motor 60 is driven when a not shown motor relay is energized.

Between the pressure regulating reservoir 20 and the M/C 13, a pipeline D is provided as an auxiliary pipeline. The pump 19 sucks the brake fluid from the M/C 13 through the pipeline D and the pressure regulating reservoir 20 and discharges it to the pipeline A through the pipeline C to supply the W/Cs 14 and 15 with the brake fluid to increases the W/C pressure of each desired wheel.

In the above, the first piping system 50a has been described. The second piping system 50b, which is similar in structure to the first piping system 50a, includes components which are the same as those included in the first piping system 50a. For example, the second piping system 50b includes a second differential pressure control valve 36 and a check valve 36a which correspond to the first differential pressure control valve 16 and the check valve 16a, third and fourth booster control valves 37 and 38 which correspond to the first and second booster control valves 17 and 18, third and fourth pressure reduction control valves 41 and 42 which correspond to the first and second pressure reduction control valves 21 and 22, a pump 39 which corresponds to the pump 19, a pressure regulating reservoir 40 which corresponds to the pressure regulating reservoir 20, and pipelines E to H which correspond to the pipelines A to D. The capacities of the W/Cs 34 and 35 of the second piping system 50b as a front piping system may be larger than those of the W/Cs 14 and 15 of the first piping system 50b as a rear piping system, so that the braking force applied to the front wheels can be larger than the braking force applied to the rear wheels.

The vehicle-use brake apparatus 1 includes a brake ECU 70 as a control unit thereof. The brake ECU 70, which is a microcomputer based unit including a CPU, a ROM a RAM and an I/O interface, executes various arithmetic processing in accordance with programs stored in the ROM to perform various braking control operations.

In this embodiment, the brake ECU 70 performs various braking control operations based on detection signals received from the stroke sensor 12, a M/C pressure sensor 80, W/C pressure sensors 81 and 82 and so on. For example, the brake ECU 70 controls the operations of various components of the brake hydraulic control actuator 50 so that a braking force corresponding to the pedal stroke S detected by the stroke sensor 12 is generated. Specifically, the brake ECU 70 sets a target W/C pressure of each wheel to be controlled based on the pedal stroke S. Further, the brake ECU 70 performs control of current supply to the valves 16 to 18, 21, 22, 36 to 38, 41 and 42, and control of current to the motor 60 for driving the pumps 19 and 39 based on the target W/C pressure. As a result, the W/C pressure of each wheel is controlled to the target W/C pressure.

For example, the brake ECU 70 calculates a value of the differential pressure to be generated by the first and second differential pressure control valve 16 and 36 depending on the target W/C pressure. This value is referred to as a command differential pressure in the following. The brake ECU 70 supplies a command current corresponding to the command differential pressure to the differential pressure control valves 16 and 36 so that a desired differential pressure is generated in the differential pressure control valves 16 and 36. Further, the brake ECU 70 drives the motor 60 to cause the pumps 19 and 39 to operate. As a result, a W/C pressure depending on the differential pressure generated by the differential pressure control valves 16 and 36 is generated.

The command differential pressure is corrected based on the pump discharge flow rate. Specifically, the command differential pressure is calculated taking into account the pressure difference which may occur between the upstream side and the downstream side of each of the first and second differential pressure control valves 16 and 36. Further, the command differential pressure is compensated also based on a deviation between the actual W/C pressure detected by the W/C pressure sensor 81 and 82 and the target W/C pressure. These compensations are performed in a later-described brake pressure control process.

The vehicle-use brake apparatus 1 according to this embodiment employs a so-called full-range assisted brake system which is comprised of the M/C 13 not provided with a brake booster and the brake hydraulic control actuator 50. In such a brake system, since the W/C pressure obtained by operating the brake pedal 11 is insufficient, the W/C pressure is assisted to make up for a deficiency by the pumps 19 and 39 over the full braking operation range. The deficiency of the W/C pressure is equal to the difference between the M/C pressure detected by the M/C pressure sensor 80 and the W/C pressure necessary to generate a braking force corresponding to the pedal stroke S. To make up for this deficiency, the first and second differential pressure control valves 16 and 36 are energized and the motor 60 is driven to cause the pumps 19 and 39 to operate.

Incidentally, the vehicle-use brake apparatus 1 can be used for other than the full-range assisted brake system, for example, an ACC (adaptive cruise control) system in which a braking force is generated regardless of the operating force of the brake pedal 11. In this case, it is also possible to set a target W/C pressure for wheels to be controlled to generate a desired braking force by causing the pumps 19 and 39 to operate while causing the first and second differential pressure control valves 16 and 36 to operate to generate differential pressures.

Next, the brake pressure control process performed by the brake ECU 70 of the vehicle-use brake apparatus 1 is explained.

As described above, to generate a necessary W/C pressure to thereby generate a desired braking force, the first and the second differential pressure control valves 16 and 36 are caused to operate. At this time, when the pumps 19 and 39 are caused to operate, a pressure difference due to the pump discharge flow occurs between the upstream side and the downstream side of the first and second differential pressure control valves 16 and 36, that is, between the M/C 13 and the W/Cs 14, 15, 34 and 35. Accordingly, the command differential pressure is calculated by subtracting the flow rate correcting pressure corresponding to the pressure difference due to the pump discharge flow from the target W/C pressure, and a current corresponding to this command differential pressure is supplied to the first and second differential pressure control valves 16 and 36 to generate the desired W/C pressure. That is, a flow rate correction is performed to correct the value of a current supplied to the first and second differential pressure control valves 16 and 36.

However, if such a flow rate correction is always performed, a pressure-increase delay may occur when it is necessary to increase the W/C pressure rapidly for sudden braking. Accordingly, in the brake pressure control process, there is performed a flow rate compensation that can accommodate a demand to increase the W/C pressure rapidly. In the following, the brake pressure control process is explained in detail with reference to FIGS. 2 to 8. This brake pressure control process is performed by the brake ECU 70 at regular cycle periods.

This process begins in step S100 where the flow rate correcting pressure corresponding to the pump discharge flow rate is acquired. The pressure difference due to the pump discharge flow increases with the increase of the pump discharge flow rate. Accordingly, a map showing a relationship between the pump discharge flow rate and the flow rate correcting pressure may be prepared in advance so that the flow rate correcting pressure can be determined using this map.

The pump discharge flow rate can be calculated based on the motor rotational speed of the motor 60. The motor rotational speed may be detected based on the output of a rotation sensor mounted on the motor 60, or may be estimated from a current flowing through the motor 60. Instead, since the value of a current supplied to the motor 60 is known by the brake ECU 70, the brake ECU 70 may calculate the motor rotational speed from the value of the current. When the motor rotational speed is estimated from a current flowing through the motor 60, since the rotational speed of the motor 60 is affected by the W/C pressure, it is preferable to correct the estimated motor rotational speed based on the output of W/C pressure sensors 81 or 82.

In subsequent step S110, it is detect whether or not the pressure difference Err between the target W/C pressure and the actual W/C pressure exceeds a first threshold ThA. Step S110 is for determining whether the actual W/C pressure is well following a change of the target W/C pressure. When the target W/C pressure changes rapidly, the actual W/C pressure does not always change rapidly, because the actual W/C pressure is affected by the performance of the pumps 19 and 39 and an amount of brake fluid consumption of the brake caliper. Hence, if the pressure difference Err is large, it can be determined that the current situation is such that the actual W/C pressure cannot faithfully follow a change of the target W/C pressure.

If the detection result in step S110 is negative, the process proceeds to step S120 where a compensation factor is set to 1 assuming that the actual W/C pressure is well following the target W/C pressure. On the other hand, if the detection result in step S110 is affirmative, the process proceeds to step S130 assuming that the actual W/C pressure is not accurately following a change of the actual W/C pressure. In step S130, it is detected whether or not the derivative ΔErr of the pressure difference Err exceeds a second threshold ThB. The derivative ΔErr is obtained as the difference of the pressure difference Err(n) detected in the current control cycle from the pressure difference Err(n−1) detected in the previous control cycle.

As described above, it is preferable to adjust the flow rate correcting pressure so that the actual W/C pressure can follow the target W/C pressure. However, when the pressure difference of the actual W/C pressure from the target W/C pressure becomes sufficiently small, it is desirable to reduce the flow rate correcting pressure to suppress the actual W/C pressure from overshooting the target W/C pressure.

Figure 4:
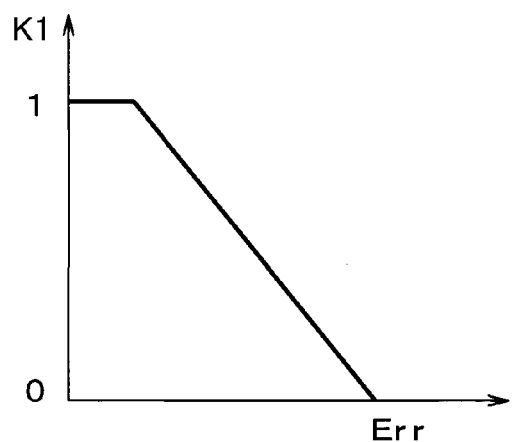
FIG. 4 is a diagram showing a relationship between a pressure difference Err and a correction factor K1 in the vehicle-use brake apparatus according to the first embodiment of the invention.

Accordingly, if the detection result in step S130 is negative, the process proceeds to step S140 where the compensation factor is set to K1. In this embodiment, a map showing a relationship between K1 and the pressure difference Err as shown in FIG. 4 is prepared in advance, so that K1 as the compensation factor can be determined using this map such that the compensation factor is reduced with the increase of the pressure difference Err. In the map shown in FIG. 4, the compensation factor of K1 becomes zero when the pressure difference Err exceeds a certain value. However, the compensation factor of K1 may be set to a predetermined lower limit when the pressure difference Err exceeds the certain value.

Figure 5:
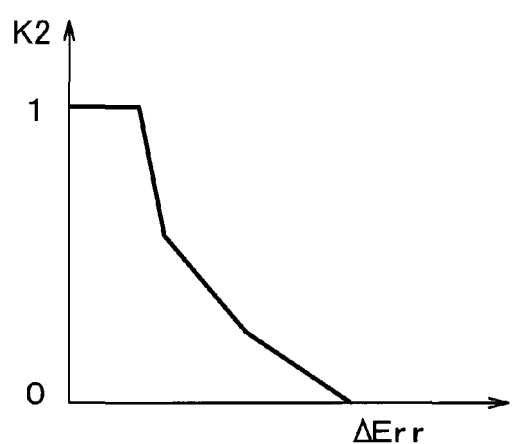
FIG. 5 is a diagram showing a relationship between a derivative $\Delta$Err of the pressure difference Err and a correction factor K2 in the vehicle-use brake apparatus according to the first embodiment of the invention.

On the other hand, if the detection result in step S130 is affirmative, the process proceeds to step S150 where the compensation factor is set to K2. In this embodiment, a map showing a relationship between K2 and the derivative ΔErr as shown in FIG. 5 is prepared in advance, so that the compensation factor of K2 can be determined using this map such that the compensation factor is reduced with the increase of the derivative ΔErr. In the map shown in FIG. 5, the compensation factor of K2 becomes zero when the derivative ΔErr exceeds a certain value. However, the compensation factor K2 may be set to a predetermined lower limit when the derivative ΔErr exceeds the certain value.

In the map shown in FIG. 4, the compensation factor of K1 decreases with the increase of the pressure difference Err with a constant slope. In the map shown in FIG. 5, the compensation factor of K2 decreases with the increase of the derivative ΔErr with a slope which decreases stepwise with the increase of the derivative ΔErr. However, these slopes may be set arbitrary as long as the compensation factor of K1 or K2 decreases with the increase of the pressure difference Err or derivative ΔErr.

After the compensation factor is set to K1 or K2, the process proceeds to step S160. In step S160, the flow rate correcting pressure is multiplied by the compensation factor set to K1 or K2 to calculate a compensated flow rate correcting pressure. When the pressure difference Err or derivative ΔErr exceeds the predetermined value, since the compensation factor of K1 or K2 is zero, and accordingly the flow rate correcting pressure is zero, correction of the command differential pressure is not performed.

Thereafter, the process proceeds to step S170 where the command differential pressure of the first and second differential pressure control valves 16 and 36 is calculated based on the compensated flow rate correcting pressure calculated in step S160. The command differential pressure can be calculated by subtracting the compensated flow rate correcting pressure calculated in step S160 from the target W/C pressure. However, in this embodiment, a temperature-compensating pressure depending on the temperature of the brake fluid is added to or subtracted from the calculated command differential pressure.

Figure 6:
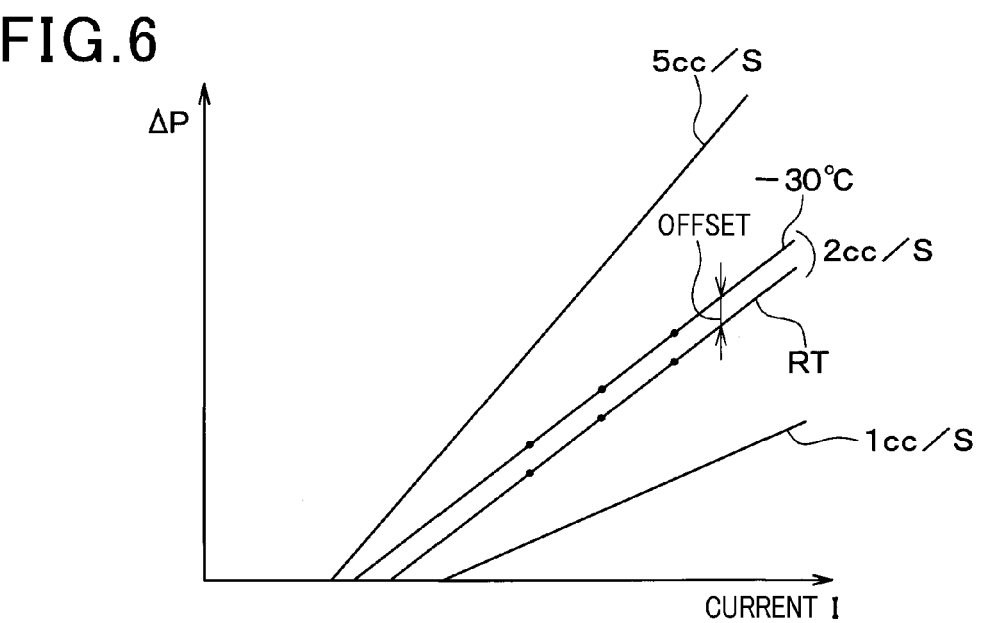
FIG. 6 is a diagram showing a relationship between a current I and a differential pressure $\Delta$P of a differential pressure control valve for each of different values of the pump discharge flow rate in the vehicle-use brake apparatus according to the first embodiment of the invention.

This is because the viscosity of brake fluid changes depending on the temperature. For example, when the current I supplied to each of the first and second differential pressure control valves 16 and 36 is increased gradually with the pump discharge flow rate being fixed constant when the temperature of the brake fluid is constant at RT, the generated differential pressure ΔP increases linearly as shown in FIG. 6. However, when the temperature of the brake fluid is very low, for example, −30 degrees C., there occurs offset in the current I-differential pressure ΔP characteristic of the first and second differential control valves 16 and 36. Accordingly, the temperature-compensating pressure corresponding to this offset is added to or subtracted from the command differential pressure.

In this embodiment, a map showing a relationship between the temperature of the brake fluid and the value of the temperature-compensating pressure is prepared in advance so that the temperature-compensating pressure can be determined based on the output of a not-shown temperature sensor for measuring the temperature of the brake fluid using this map. The slope of the curve of the current I-differential pressure ΔP characteristic is affected by the pump discharge flow rate. Accordingly, it is preferable to determine the temperature-compensating pressure based on the temperature of the brake fluid and further the pump discharge flow rate.

The command current is calculated based on the thus calculated command differential pressure. The calculated command current is supplied to each of the first and second differential control valves 16 and 36, and the motor 60 is driven to cause the pumps 19 and 39 to operate. As a result, the actual W/C pressure is generated so as to follow the target W/C pressure with less time delay to enable increasing the W/C pressure rapidly when heavy braking is necessary.

Next, an example of the brake pressure control process as described above is explained with reference to FIGS. 7A and 7B.

Figure 7A:
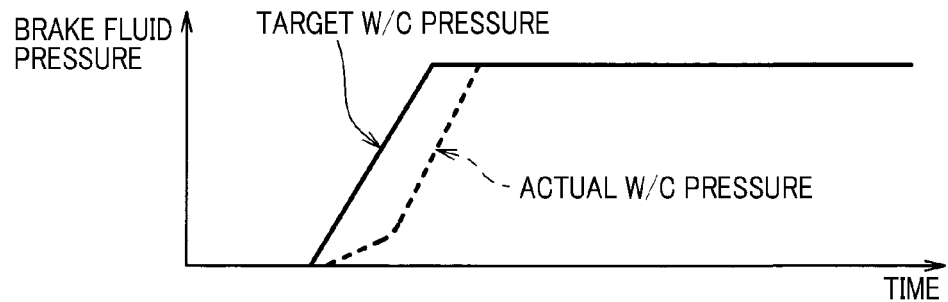
FIG. 7A is a diagram showing variations with time of a target W/C pressure and an actual W/C pressure when the flow rate correction is restricted by the brake pressure control process.
Figure 7B:
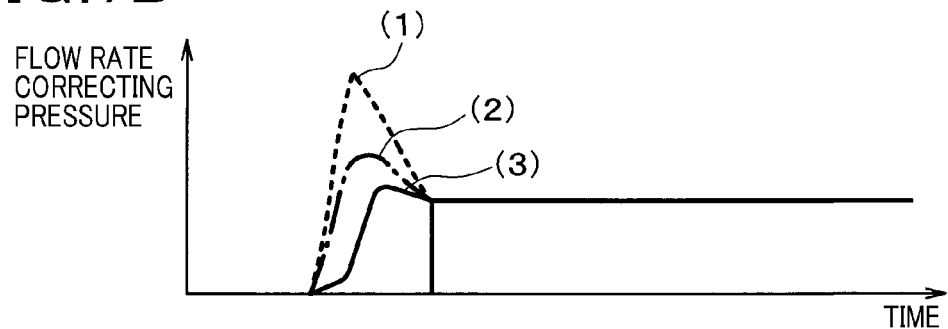
FIG. 7B is a diagram showing variations with time of a flow rate correcting pressure when the flow rate correction is restricted by the brake pressure control process.

In this example, it is assumed that the target W/C pressure increases with a constant slope, and then becomes constant as shown in FIG. 7A.

Accordingly, in this example, when the pressure difference Err between the target W/C pressure and the actual W/C pressure does not exceed the first threshold ThA, since the compensation factor is set to 1, the flow rate correcting pressure not being compensated is used to calculate the command pressure for the first and second differential pressure control valves 16 and 36. In this case, the flow rate correcting pressure takes a large value as shown by the curve (1) in FIG. 7B.

When the pressure difference Err between the target W/C pressure and the actual W/C pressure exceeds the first threshold ThA but the derivative ΔErr does not exceed the second threshold ThB, since the compensation factor is set to K1, the flow rate correcting pressure compensated by being multiplied by K1 is used to calculate the command pressure for the first and second differential pressure control valves 16 and 36. In this case, the flow rate correcting pressure takes a value smaller than the value taken in the above case (see the curve (2) in FIG. 7B). Although not shown in the drawings, when the pressure difference Err exceeds a predetermined value and the compensation factor of K1 is set to 0, since the flow rate correcting pressure becomes 0, flow rate correction is not performed.

When the pressure difference Err between the target W/C pressure and the actual W/C pressure exceeds the first threshold ThA and also the derivative ΔErr exceeds the second threshold ThB, since the compensation factor is set to K2, the flow rate correcting pressure compensated by being multiplied by K2 is used to calculate the command pressure for the first and second differential pressure control valves 16 and 36. In this case, the flow rate correcting pressure takes a value smaller than the value taken in the above two cases (see the curve (3) in FIG. 7B). Although not shown in the drawings, when the derivative ΔErr exceeds a predetermined value, and the compensation factor of K2 is set to 0, since the flow rate correcting pressure becomes 0, flow rate correction is not performed.

As explained above, when the actual W/C pressure is smaller than the target W/C pressure, flow rate correction is restricted or is not performed. More specifically, the flow rate correcting pressure is restricted more when the pressure difference Err between the target W/C pressure and the actual W/C pressure is larger, or when the derivative ΔErr of the pressure difference Err is larger. Hence, the actual W/C pressure is generated so as to follow the target W/C pressure with less time delay to enable increasing the W/C pressure rapidly when heavy braking is necessary.

Figure 8A:
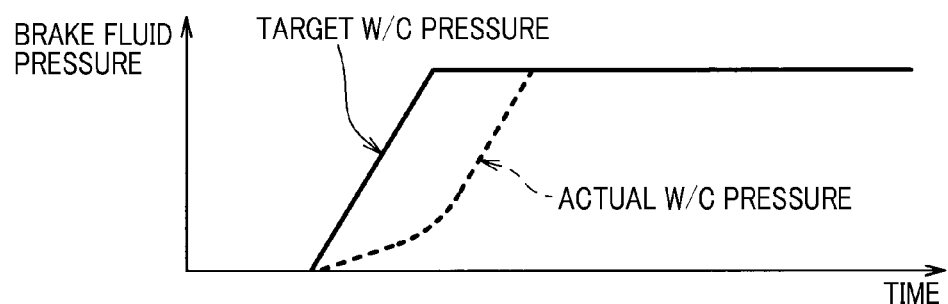
FIG. 8A is a diagram showing variations with time of the target W/C pressure and the actual W/C pressure when the flow rate correction is not restricted by the brake pressure control process.
Figure 8B:
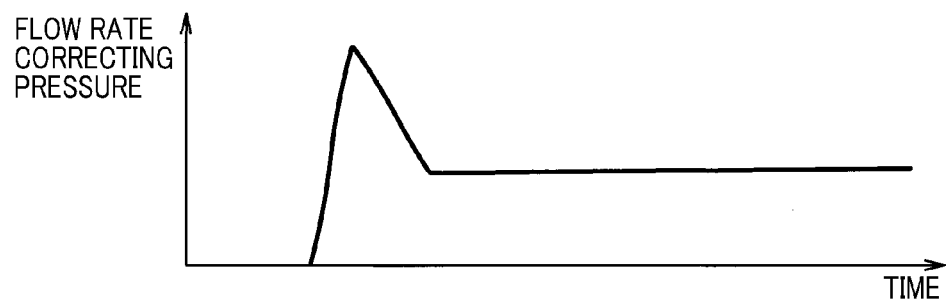
FIG. 8B is a diagram showing a variation with time of the flow rate correcting pressure when the flow rate correction is not restricted by the brake pressure control process.

When the flow rate correcting pressure is not compensated based on the pressure difference Err or its derivative ΔErr, the brake fluid pressure changes with time as shown in FIG. 8A. In this case, the pumps 19 and 39 are caused to change a discharge amount of the brake fluid in accordance with a change of the target W/C pressure to increase the actual W/C pressure. At this time, in a region where the pressure is low and the change rate of the target W/C pressure is large, since the motor speed is increased to supply a sufficient amount of the brake fluid to the brake caliper, the flow rate correcting pressure set depending on the pump discharge flow rate becomes large. Accordingly, the command differential pressure of each of the first and the second differential pressure control valves 16 and 36 becomes small. As a result, there occurs a time delay in increasing the W/C pressure when the W/C pressure has to be increased rapidly.

Second Embodiment

Next, a second embodiment of the invention is described with a focus on differences with the first embodiment.

In the second embodiment, a brake pressure control process as shown in FIG. 9 is performed. This brake pressure control process is different from the brake pressure control process shown in FIG. 2 in that step S150 is replaced with step S150A. In this embodiment, if the detection result in step S130 is affirmative, the process proceeds to step S150A. In step S150A, the compensation factor is set to K1×K2, that is, set to the compensation factor of K1 set in accordance with the pressure difference Err multiplied by the compensation factor of K2 set in accordance with the derivative ΔErr.

That is, in this embodiment, when the pressure difference Err exceeds the first threshold ThA and the derivative ΔErr exceeds the second threshold ThB, the compensation factor is set to K1×K2. According to the second embodiment, the flow rate correcting pressure can be compensated taking into account both the pressure difference Err and the derivative ΔErr.

Other Embodiments

It is a matter of course that various modifications can be made to the above described embodiments as described below.

In the first and second embodiments, the flow rate correcting pressure is compensated based on both the pressure difference Err and the derivative ΔErr. However, the flow rate correcting pressure may be compensated based on only one of the pressure difference Err and the derivative ΔErr.

In the first and second embodiments, compensation of the flow rate correcting pressure is performed using a map. However, compensation of the flow rate correcting pressure may be performed using a function expression which defines the compensation factor as a function of the pressure difference Err or the derivative ΔErr.

The above explained preferred embodiments are exemplary of the invention of the present application which is described solely by the claims appended below. It should be understood that modifications of the preferred embodiments may be made as would occur to one of skill in the art.

Step S100 corresponds to the correcting pressure acquisition section, steps S110 to S160 and S150A correspond to the correction restriction section and step S170 corresponds to the command differential pressure acquisition section, which are described in the appended claims.

What is claimed is:

1. A vehicle-use brake apparatus comprising:
   a brake operating member operated by a vehicle driver;
   a master cylinder configured to generate a master cylinder pressure in accordance with an operation amount of the brake operating member;
   at least one wheel cylinder configured to generate a braking force to a vehicle wheel when applied with a wheel cylinder pressure caused by the master cylinder pressure;
   a differential pressure control valve provided in a main pipeline connected between the master cylinder and the wheel cylinder to generate a differential pressure between the master cylinder pressure and the wheel cylinder pressure;
   a pump configured to increase the wheel cylinder pressure by discharging a brake fluid between the differential pressure control valve and the wheel cylinder with the differential pressure being generated by the differential pressure control valve;
   a motor configured to drive the pump; and
   a control unit configured to output a command differential pressure to the differential pressure control valve, which is a value of the differential pressure between the master cylinder and the wheel cylinder that is generated by the differential pressure control valve and set depending on a target wheel cylinder pressure;
   the motor being driven to cause the pump to operate to increase the wheel cylinder pressure with the differential pressure being generated by the differential pressure control valve to generate the braking force; wherein
   the control unit includes:
   a correcting pressure acquisition section that acquires a flow rate correcting pressure corresponding to a discharge amount of the brake fluid discharged by the pump;

a command differential pressure acquisition section configured to acquire the command differential pressure by performing a flow rate correction where the master cylinder pressure and the flow rate correcting pressure are subtracted from the target wheel cylinder pressure; and a correction restriction section configured to perform a correction restriction by which the flow rate correcting pressure is reduced or the flow rate correction is not performed if an actual wheel cylinder pressure is smaller than the target wheel cylinder pressure.

2. The vehicle-use brake apparatus according to claim 1, wherein the correction restriction section is configured to calculate a corrected flow rate correcting pressure by multiplying the flow rate correcting pressure by a compensation factor which is reduced with increase of a pressure difference between the target wheel cylinder pressure and the actual wheel cylinder pressure.

3. The vehicle-use brake apparatus according to claim 1, wherein the correction restriction section performs the correction restriction if a pressure difference between the target wheel cylinder pressure and the actual wheel cylinder pressure is larger than a predetermined threshold.

4. The vehicle-use brake apparatus according to claim 3, wherein the correction restriction section sets the flow rate correcting pressure to zero if the pressure difference between the target wheel cylinder pressure and the actual wheel cylinder pressure exceeds a predetermined value which is larger than the predetermined threshold.

5. The vehicle-use brake apparatus according to claim 1, wherein the correction restriction section is configured to calculate a corrected flow rate correcting pressure by multiplying the flow rate correcting pressure by a compensation factor which is reduced with increase of a derivative of a pressure difference between the target wheel cylinder pressure and the actual wheel cylinder pressure.

6. The vehicle-use brake apparatus according to claim 1, wherein the correction restriction section performs the correction restriction if a derivative of a pressure difference between the target wheel cylinder pressure and the actual wheel cylinder pressure is larger than a predetermined threshold.

7. The vehicle-use brake apparatus according to claim 6, wherein the correction restriction section sets the flow rate correcting pressure to zero if the derivative of a pressure difference between the target wheel cylinder pressure and the actual wheel cylinder pressure exceeds a predetermined value larger than the predetermined threshold.

* * * * *